US010216017B2

(12) United States Patent
Chang et al.

(10) Patent No.: US 10,216,017 B2
(45) Date of Patent: Feb. 26, 2019

(54) LIQUID CRYSTAL DISPLAY PANEL

(71) Applicant: AU OPTRONICS CORPORATION, Hsin-chu (TW)

(72) Inventors: Wan-Heng Chang, Hsin-chu (TW); Chen-Feng Fan, Hsin-chu (TW); Rong-Fu Lin, Hsin-chu (TW); Sung-Yu Su, Hsin-chu (TW); Hsiao-Wei Cheng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 183 days.

(21) Appl. No.: 15/393,954

(22) Filed: Dec. 29, 2016

(65) Prior Publication Data

US 2018/0052342 A1    Feb. 22, 2018

(30) Foreign Application Priority Data

Aug. 17, 2016 (TW) .............................. 105126185 A

(51) Int. Cl.
*G02F 1/13*        (2006.01)
*G02F 1/1333*    (2006.01)
(Continued)

(52) U.S. Cl.
CPC .......... *G02F 1/1323* (2013.01); *G02F 1/1337* (2013.01); *G02F 1/13338* (2013.01);
(Continued)

(58) Field of Classification Search
CPC .......................................... G02F 2001/134381
(Continued)

(56) References Cited

U.S. PATENT DOCUMENTS 8,576,356 B2    11/2013   Jin et al.
9,058,782 B2     6/2015   Fan et al.
(Continued)

FOREIGN PATENT DOCUMENTS

JP    11-007045 A     1/1999
TW    200702860 A     1/2007
TW       I412844 B    10/2013

OTHER PUBLICATIONS

Office Action issued by (TIPO) Intellectual Property Office, Ministry of Economic Affairs, R. O. C. dated Mar. 14, 2017 for Application No. 105126185, Taiwan.

*Primary Examiner* — Lucy P Chien
(74) *Attorney, Agent, or Firm* — Tim Tingkang Xia, Esq.; Locke Lord LLP

(57) ABSTRACT

A liquid crystal display panel includes a first substrate, a second substrate, a third substrate, a pixel electrode layer, a first common electrode layer, a first control electrode layer, a first liquid crystal layer, a second common electrode layer, a second control electrode layer and a second liquid crystal layer. The second substrate is opposite to the first substrate. The third substrate is opposite to the second substrate. The pixel electrode layer and the first common electrode layer are disposed on the first substrate. The first control electrode layer is disposed on the second substrate. The first liquid crystal layer is disposed between the first substrate and the second substrate. The second common electrode layer is disposed on the second substrate. The second control electrode layer is disposed on the third substrate. The second liquid crystal layer is disposed between the second substrate and the third substrate.

16 Claims, 13 Drawing Sheets

(51) Int. Cl.
*G02F 1/1335* (2006.01)
*G02F 1/1337* (2006.01)
*G02F 1/1343* (2006.01)
*G02F 1/1347* (2006.01)

(52) U.S. Cl.
CPC .... *G02F 1/13471* (2013.01); *G02F 1/133345* (2013.01); *G02F 1/133528* (2013.01); *G02F 1/134363* (2013.01); *G02F 2001/133531* (2013.01); *G02F 2201/121* (2013.01); *G02F 2201/123* (2013.01)

(58) Field of Classification Search
USPC .......................................................... 349/74
See application file for complete search history.

(56) References Cited

U.S. PATENT DOCUMENTS

| | | | |
|---|---|---|---|
| 2006/0267905 A1 | 11/2006 | Nishino et al. | |
| 2007/0085957 A1* | 4/2007 | Jin | G02F 1/1323 349/141 |
| 2014/0104524 A1* | 4/2014 | Lee | G09G 3/36 349/41 |
| 2016/0026014 A1* | 1/2016 | Zhao | G02F 1/134363 349/33 |

* cited by examiner

LIQUID CRYSTAL DISPLAY PANEL

CROSS-REFERENCE TO RELATED PATENT APPLICATION

This application claims the benefit of priority to Taiwan Patent Application No. 105126185, filed Aug. 17, 2016. The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to liquid crystal display panels, and in particular, to an omnidirectional anti-peeping liquid crystal display panel.

BACKGROUND

Liquid crystal display panels have advantages of thinness, shortness, and energy conservation, and have been widely applied to various electronic products and portable electronic productions, for example, televisions, desktop computers (Desktop PC), smart phones, notebooks, and tablet computers (Tablet PC). As the liquid crystal display panel technology develops and people care more about privacy, the anti-peeping technology for liquid crystal display panels gains more attentions, and the industry spares no effort to study the anti-peeping technology for the liquid crystal display panels. Therefore, how to produce a liquid crystal display panel on which a visual angle can be adjusted to provide an anti-peeping function is a research urgently to be studied currently.

SUMMARY

An objective of at least one embodiment of the present invention is to provide a liquid crystal display panel, so that two liquid crystal layers and electrode layers are set to implement omnidirectional anti-peeping.

At least one embodiment of the present invention provides a liquid crystal display panel, including a first substrate, a second substrate, a third substrate, a pixel electrode layer, a first common electrode layer, a first control electrode layer, a first liquid crystal layer, a second common electrode layer, a second control electrode layer, and a second liquid crystal layer, where the second substrate and the first substrate are opposite to each other, the second substrate has a first surface and a second surface, and the first surface faces the first substrate; the third substrate and the second substrate are opposite to each other, and the second substrate is located between the first substrate and the third substrate; the pixel electrode layer and the first common electrode layer are disposed on the first substrate; the first control electrode layer is disposed on the second substrate; the first liquid crystal layer is disposed between the first substrate and the second substrate, the first liquid crystal layer includes first liquid crystal molecules, and the first liquid crystal molecules being adjacent to the first substrate and the first liquid crystal molecules being adjacent to the second substrate are aligned along a first direction; the second common electrode layer is disposed on the second substrate; the second control electrode layer is disposed on the third substrate; the second liquid crystal layer is disposed between the second substrate and the third substrate, the second liquid crystal layer includes second liquid crystal molecules, the second liquid crystal molecules being adjacent to the second substrate and the second liquid crystal molecules being adjacent to the third substrate are aligned along a second direction, and the second direction is not parallel to the first direction.

At least one embodiment of the present invention further provides a liquid crystal display panel, including a liquid crystal panel with a horizontal electric field, an opposite substrate, and a second liquid crystal layer, where the liquid crystal panel with a horizontal electric field has a first control electrode layer, a first liquid crystal layer, and a pixel electrode layer, the first liquid crystal layer is located between the pixel electrode layer and the first control electrode layer, and the second liquid crystal layer is located between the liquid crystal panel with a horizontal electric field and the opposite substrate.

In the liquid crystal display panel in at least one embodiment of the present invention, two liquid crystal layers and electrode layers are set to form two liquid crystal structures, so that the two liquid crystal structures are respectively used for anti-peeping in different angles, to generate four different image display modes, and a user optionally uses the liquid crystal display panel to implement anti-peeping in a single angle or omnidirectional anti-peeping.

DETAILED DESCRIPTION

To make a person of ordinary skill in the art further understand the present invention, the following describes in detail content and effects of the present invention by using exemplary embodiments of the present invention and with reference to the accompanying drawings.

Figure 1:
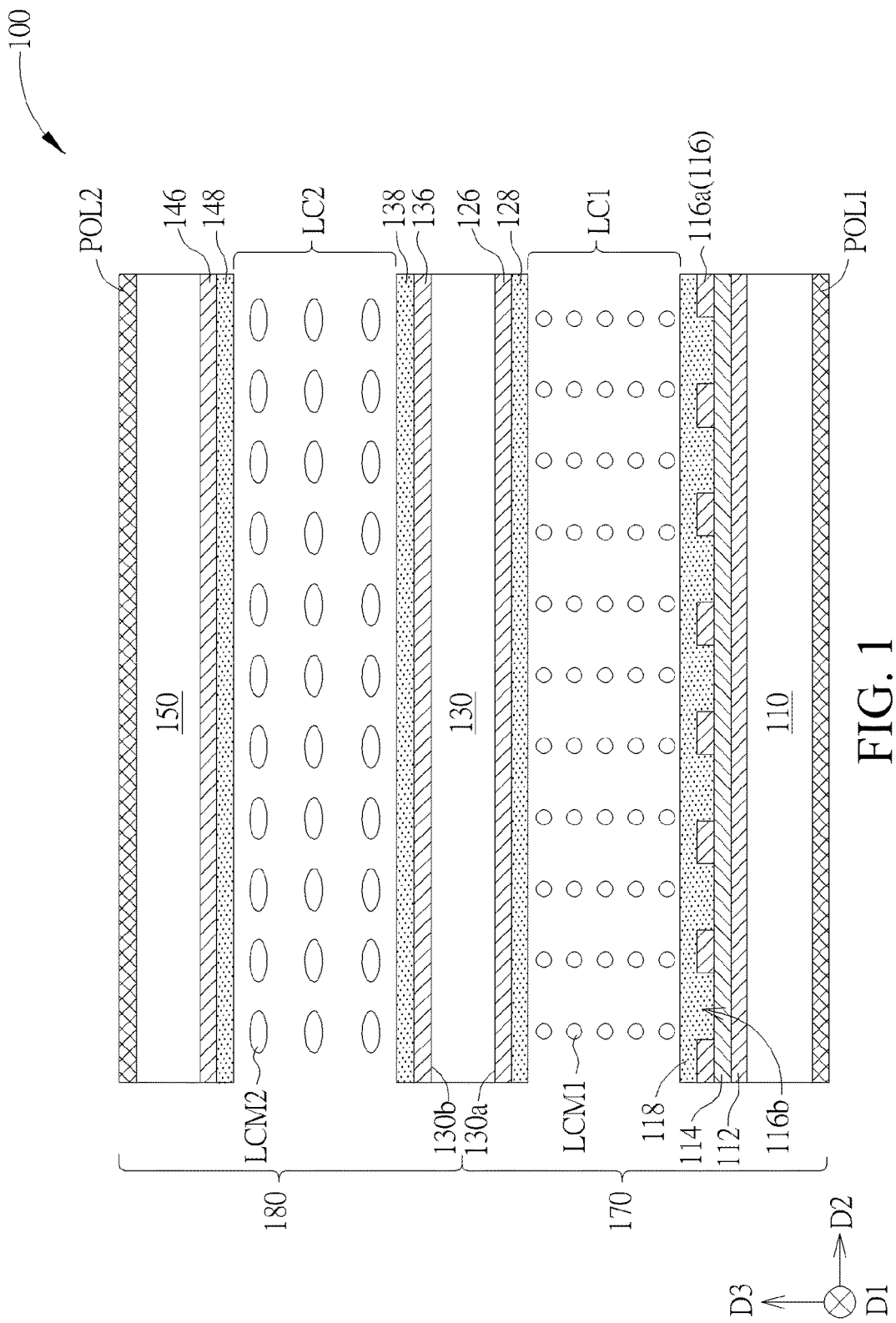
FIG. 1 is a schematic sectional view of a liquid crystal display panel according to a first embodiment of the present invention.

Referring to FIG. 1, FIG. 1 is a schematic sectional view of a liquid crystal display panel according to a first embodiment of the present invention. As shown in FIG. 1, a liquid crystal display panel 100 in this embodiment includes a first substrate 110, a second substrate 130, a third substrate 150, a pixel electrode layer 112, a first common electrode layer 116, a first control electrode layer 126, a first liquid crystal layer LC1, a second common electrode layer 136, a second control electrode layer 146, and a second liquid crystal layer LC2. The following sequentially describes structures of the foregoing components and a disposing relationship between the components. The second substrate 130 and the first substrate 110 are set opposite to each other, the second substrate 130 includes a first surface 130a and a second surface 130b, and the first surface 130a faces the first substrate 110. The third substrate 150 and the second substrate 130 are set opposite to each other, the second substrate 130 is located between the first substrate 110 and the third substrate 150, and the second surface 130b of the second substrate 130 faces the third substrate 150. The pixel electrode layer 112 and the first common electrode layer 116 are disposed on the first substrate 110. Optionally, in this embodiment, the pixel electrode layer 112 is disposed between the first common electrode layer 116 and the first substrate 110, and the liquid crystal display panel 100 may further includes an insulation layer 114, disposed on the pixel electrode layer 112 and located between the pixel electrode layer 112 and the first common electrode layer 116, which, however, is not limited thereto. In a varied embodiment, the first common electrode layer 116 is disposed between the pixel electrode layer 112 and the first substrate 110, and the insulation layer 114 is disposed on the first common electrode layer 116 and is located between the first common electrode layer 116 and the pixel electrode layer 112. In another varied embodiment, the pixel electrode layer 112 and the first common electrode layer 116 are formed by a same conducting layer and are disposed on a same plane in a staggered manner, and a case shown in FIG. 1 in which the entire insulation layer 114 is disposed between the pixel electrode layer 112 and the first common electrode layer 116 does not exist. For example, the pixel electrode layer 112 and/or the first common electrode layer 116 may be of an inter-digital shape, which, however, is not limited thereto. In addition, the pixel electrode layer 112 includes pixel electrodes, the pixel electrodes may be electrodes having no slit, are electrically insulated against the first common electrode layer 116, and cooperate with other components (for example, a switch component, a scanning line, and a data line) to form sub-pixels on the first substrate 110, so that the sub-pixels are used for display. The first control electrode layer 126 is disposed on the second substrate 130, and the first control electrode layer 126 is disposed on the first surface 130a of the second substrate 130. That is, the first control electrode layer 126 is located between the first substrate 110 and the second substrate 130. In this embodiment, an entire surface of electrodes is used as an example of the first control electrode layer 126, which, however, is not limited thereto. The first liquid crystal layer LC1 is disposed between the first substrate 110 and the second substrate 130, and the first liquid crystal layer LC1 includes multiple first liquid crystal molecules LCM1. First liquid crystal molecules LCM1 adjacent to the first substrate 110 and first liquid crystal molecules LCM1 adjacent to the second substrate 130 are aligned along a first direction D1. In addition, in this embodiment, for example, the liquid crystal display panel 100 further includes a first alignment layer 118 and a second alignment layer 128. The first alignment layer 118 is disposed on a surface of the first substrate 110 facing the second substrate 130, and the second alignment layer 128 is disposed on the first surface 130a of the second substrate 130. The first alignment layer 118 is used to align the first liquid crystal molecules LCM1 adjacent to the first substrate 110, so that the first liquid crystal molecules LCM1 are aligned along the first direction D1, and the second alignment layer 128 is used to align the first liquid crystal molecules LCM1 adjacent to the second substrate 130, so that the first liquid crystal molecules LCM1 are aligned along the first direction D1.

The second common electrode layer 136 is disposed on the second substrate 130. Accurately, the second common electrode layer 136 is disposed on the second surface 130b of the second substrate 130. That is, the second common electrode layer 136 is located between the second substrate 130 and the third substrate 150. In this embodiment, the second common electrode layer 136 is an entire surface of electrodes, but is not limited thereto. The second control electrode layer 146 is disposed on the third substrate 150, and in this embodiment, the second control electrode layer 146 is disposed on a surface of the third substrate 150 facing the second substrate 130. In this embodiment, the second control electrode layer 146 is an entire surface of electrodes, but is not limited thereto. The second liquid crystal layer LC2 is disposed between the second substrate 130 and the third substrate 150, and the second liquid crystal layer LC2 includes second liquid crystal molecules LCM2. Second liquid crystal molecules LCM2 adjacent to the second substrate 130 and second liquid crystal molecules LCM2 adjacent to the third substrate 150 are aligned along a second direction D2. The second direction D2 is not parallel to the first direction D1. That is, the first liquid crystal molecules LCM1 and the second liquid crystal molecules LCM2 are aligned along different directions. In this embodiment, the second direction D2 is perpendicular to the first direction D1, which, however, is not limited thereto. In addition, in this embodiment, for example, the liquid crystal display panel 100 further includes a third alignment layer 138 and a fourth alignment layer 148. The third alignment layer 138 is disposed on the second surface 130b of the second substrate 130, and the fourth alignment layer 148 is disposed on the surface of the third substrate 150 facing the second substrate 130. The third alignment layer 138 is used to align the second liquid crystal molecules LCM2 adjacent to the second substrate 130, so that the second liquid crystal molecules LCM2 are aligned along the second direction D2, and the fourth alignment layer 148 is used to align the second liquid crystal molecules LCM2 adjacent to the third substrate 150, so that the second liquid crystal molecules LCM2 are aligned along the second direction D2. In addition, in this embodiment, for example, the first liquid crystal molecules LCM1 and the second liquid crystal molecules LCM2 are with positive dielectric anisotropy, which, however, is not limited thereto. In a varied embodiment, the first liquid crystal molecules LCM1 and the second liquid crystal molecules LCM2 may be liquid crystal of different types. For example, the first liquid crystal molecules LCM1 are with positive dielectric anisotropy, and the second liquid crystal molecules LCM2 are negative liquid crystal.

Figure 2:
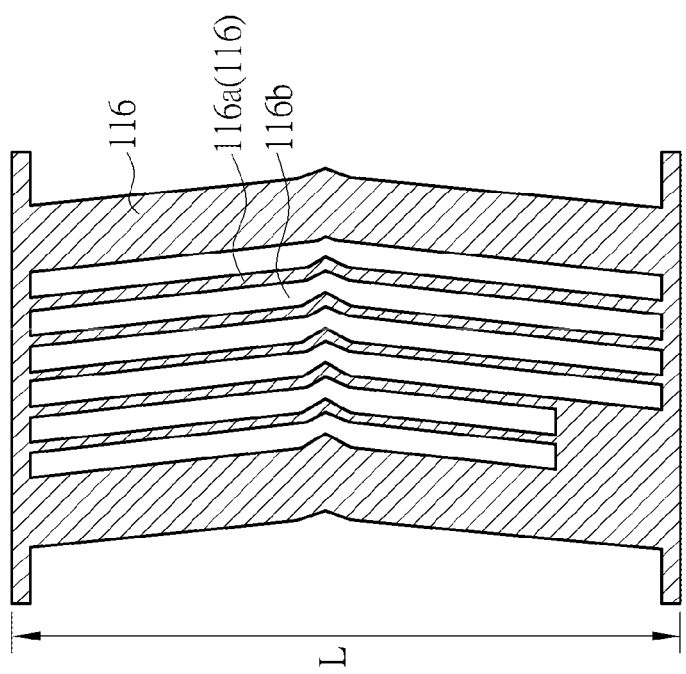
FIG. 2 is a schematic top view of a part of a first common electrode layer of the liquid crystal display panel according to the first embodiment of the present invention.
Figure 2:
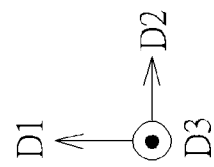

Referring to FIG. 2, FIG. 2 is a schematic top view of a part of the first common electrode layer of the liquid crystal display panel according to the first embodiment of the present invention. FIG. 2 shows only a part, in single sub-pixels, of the first common electrode layer 116. The part, in the sub-pixels, of first common electrode layer 116 has a length direction L, and the length direction L is parallel to the first direction D1. As shown in FIG. 2, the part, in the sub-pixels, of the first common electrode layer 116 includes branch electrodes 116a and slits 116b. Extension directions of the branch electrodes and the multiple slits are, for example, the same. Each slit 116b is located between two neighboring branch electrodes 116a, to provide a good liquid crystal control electric field. The extension direction of the branch electrodes 116a is approximately parallel to the alignment direction (that is, the first direction D1) of the first liquid crystal molecules LCM1. That is, the extension direction of the branch electrodes 116a is approximately parallel to the length direction L of the part, in the sub-pixels, of the first common electrode layer 116, and there is an included angle less than or equal to 45 degrees between the extension direction of the branch electrodes 116a and the first direction D1, so that during operation of the liquid crystal display panel 100, an electric field generated by the first common electrode layer 116 and the pixel electrodes can affect a rotation direction of the first liquid crystal molecules LCM1. In addition, the branch electrodes 116a may be bent electrodes, linear electrodes or electrodes of another appropriate pattern, and in this embodiment, the branch electrodes 116a may be bent electrodes.

As shown in FIG. 1, the liquid crystal display panel 100 in this embodiment may further include a first polarizer POL1 and a second polarizer POL2. The first substrate 110 is located between the second substrate 130 and the first polarizer POL1, and the third substrate 150 is located between the second substrate 130 and the second polarizer POL2. That is, the first substrate 110, the second substrate 130, and the third substrate 150 are all located between the first polarizer POL1 and the second polarizer POL2 for example. A polarization axis of the first polarizer POL1 may be parallel or perpendicular to the first direction D1, and a polarization axis of the second polarizer POL2 is perpendicular to the polarization axis of the first polarizer POL1. In this embodiment, the polarization axis of the first polarizer POL1 is parallel to the first direction D1, and the polarization axis of the second polarizer POL2 is perpendicular to the first direction D1. That is, the polarization axis of the second polarizer POL2 is parallel to the second direction D2. Therefore, the polarization axis of the first polarizer POL1 is parallel to the alignment direction of the first liquid crystal molecules LCM1, and the polarization axis of the second polarizer POL2 is parallel to the alignment direction of the second liquid crystal molecules LCM2, which, however, is not limited thereto.

Therefore, by means of the foregoing structure configuration, in the liquid crystal display panel 100 in this embodiment, a first structure 170 may be formed between the first substrate 110 and the second substrate 130, and a second structure 180 may be formed between the second substrate 130 and the third substrate 150. The first structure 170 is a liquid crystal display panel used to display an image, for example, a liquid crystal display panel with a horizontal electric field or a fringing electric field. When the liquid crystal display panel 100 in this embodiment is used to display an image, the pixel electrodes of the pixel electrode layer 112 and the first common electrode layer 116 have different potentials. Therefore, an electric field may be generated between the pixel electrodes of the pixel electrode layer 112 and the first common electrode layer 116, so that the first liquid crystal molecules LCM1 on the first liquid crystal layer LC1 rotate horizontally, and further, the first structure 170 displays the image. In addition, the first structure 170 may further include a color filter layer (not shown in the figure), disposed between the first substrate 110 and the second substrate 130. That is, the color filter layer may be disposed on the surface of the first substrate 110 facing the second substrate 130 or disposed on the first surface 130a of the second substrate 130, to achieve a color display effect.

In the liquid crystal display panel 100 in at least one embodiment of the present invention, four different image display modes of a wide viewing angle mode, a first narrow viewing angle mode, a second narrow viewing angle mode, and a third narrow viewing angle mode may be provided according to a potential difference between the first common electrode layer 116 and the first control electrode layer 126 and a potential difference between the second common electrode layer 136 and the second control electrode layer 146. The following sequentially describes the four image display modes. In addition, for the convenience of description, a third direction D3 is defined in this specification. The third direction is perpendicular to the first direction D1 and the second direction D2, and is perpendicular to the first surface 130a and the second surface 130b of the second substrate 130. In this embodiment, because the first direction D1 is perpendicular to the second direction D2, the first direction D1, the second direction D2, and the third direction D3 are perpendicular to each other.

Figure 3:
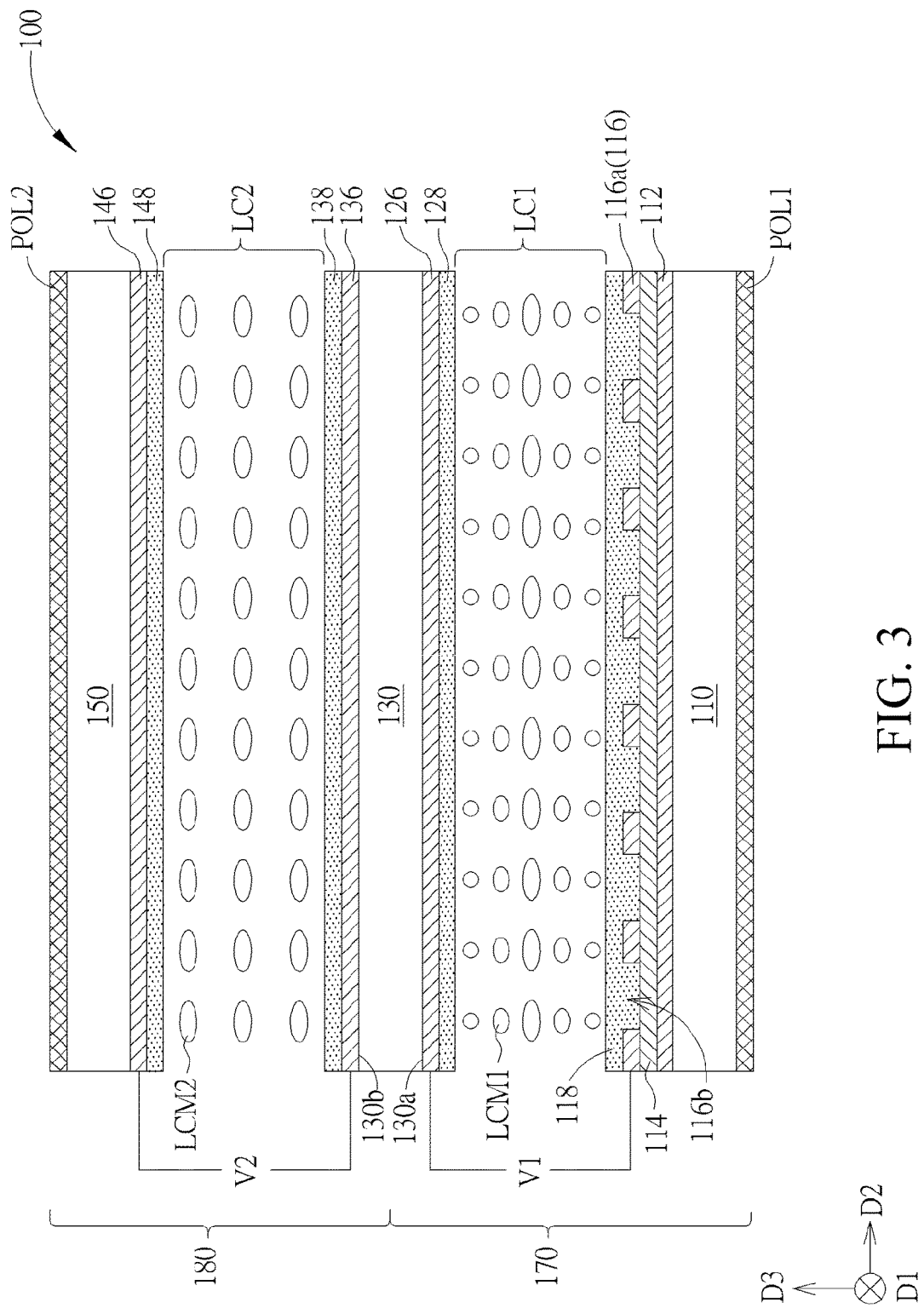
FIG. 3 is a schematic sectional view of the liquid crystal display panel in a wide viewing angle mode according to the first embodiment of the present invention.

Referring to FIG. 3, FIG. 3 is a schematic sectional view of the liquid crystal display panel in a wide viewing angle mode according to the first embodiment of the present invention. As shown in FIG. 3, because the liquid crystal display panel 100 is in an image display mode, the first liquid crystal molecules LCM1 of the liquid crystal display panel 100 may rotate horizontally due to the electric field generated between the pixel electrodes of the pixel electrode layer 112 and the first common electrode layer 116, to display an image. According to the present embodiment, when the liquid crystal display panel 100 is in the wide viewing angle mode, there is a first potential difference V1 between the first common electrode layer 116 and the first control electrode layer 126, and there is a second potential difference V2 between the second common electrode layer 136 and the second control electrode layer 146. In this embodiment, the first potential difference V1 is about 0 volts to 5 volts, and the second potential difference V2 is about 0 volt, which, however, is not limited thereto. In this mode, relative to a potential difference between the pixel electrodes of the pixel electrode layer 112 and the first common electrode layer 116, because the first potential difference V1 between the first common electrode layer 116 and the first control electrode layer 126 is very small, an electric field of the first potential difference V1 substantially may not cause the first liquid crystal molecules LCM1 to rotate along the third direction D3; and similarly, because the second potential difference V2 is very small, an electric field substantially may not cause the second liquid crystal molecules LCM2 to rotate along the third direction D3. That is, according to the present embodiment, when the liquid crystal display panel 100 is in the wide viewing angle mode, relative to the electric field or the potential difference that is used for image display, the first potential difference V1 and the second potential difference V2 that are used to control the angle are very small or approach 0 volt, so that display effects of the first liquid crystal molecules LCM1 and the second liquid crystal molecules LCM2 are not affected by the first potential difference V1 and the second potential difference V2. Therefore, neither the first structure 170 nor the second structure 180 enables an anti-peeping function, so that the display image of the liquid crystal display panel 100 can be viewed in the wide viewing angle mode.

Figure 4:
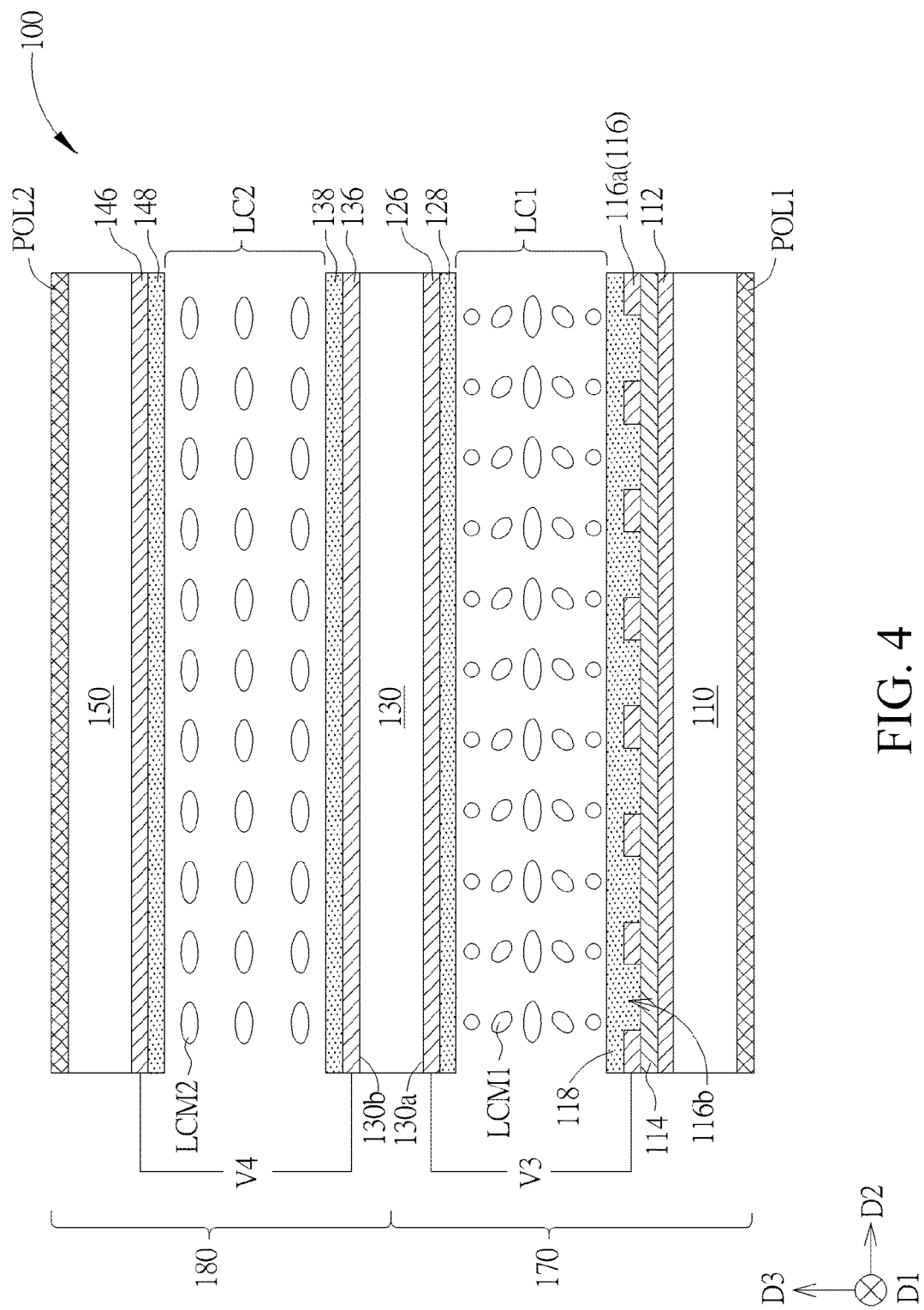
FIG. 4 is a schematic sectional view of the liquid crystal display panel in a first narrow viewing angle mode according to the first embodiment of the present invention.

Referring to FIG. 4, FIG. 4 is a schematic sectional view of the liquid crystal display panel in a first narrow viewing angle mode according to the first embodiment of the present invention. As shown in FIG. 4, according to the present embodiment, when the liquid crystal display panel 100 is in the first narrow viewing angle mode, there is a third potential difference V3 between the first common electrode layer 116 and the first control electrode layer 126 and there is a fourth potential difference V4 between the second common electrode layer 136 and the second control electrode layer 146. The third potential difference V3 is greater than the first potential difference V1, and the fourth potential difference V4 may be equal to the second potential difference V2. In this embodiment, the third potential difference V3 is about 0 volts to 10 volts, and the fourth potential difference V4 is about 0 volts, which, however, is not limited thereto. In this mode, relative to the first potential difference V1, because the third potential difference V3 is relatively large, an electric field may cause the first liquid crystal molecules LCM1 to rotate or topple over along the third direction D3; in another aspect, because the fourth potential difference V4 is relatively small, an electric field substantially may not cause the second liquid crystal molecules LCM2 to rotate along the third direction D3. That is, a display effect of the first liquid crystal molecules LCM1 may be affected by the third potential difference V3, and a display effect of the second liquid crystal molecules LCM2 substantially may not be affected by the fourth potential difference V4. In addition, in the first narrow viewing angle mode, because the first liquid crystal molecules LCM1 substantially rotate or topple over along the third direction D3, polarization directions of light rays passing through the first liquid crystal layer LC1 are changed, so that after the light rays pass through the second polarizer POL2, contrast viewed by a user in a particular direction decreases, a viewed display image is relatively fuzzy, to implement an anti-peeping function in the particular direction. In this embodiment, in the first narrow viewing angle mode of the liquid crystal display panel 100, anti-peeping may be performed for display in a horizontal angle. That is, the first structure 170 provides the relatively large third potential difference V3, to enable an anti-peeping function in some angles, so that contrast of an image viewed by the user in the horizontal direction decreases, to implement an anti-peeping function in the horizontal angle. The second structure 180 does not enable an anti-peeping function.

Figure 5:
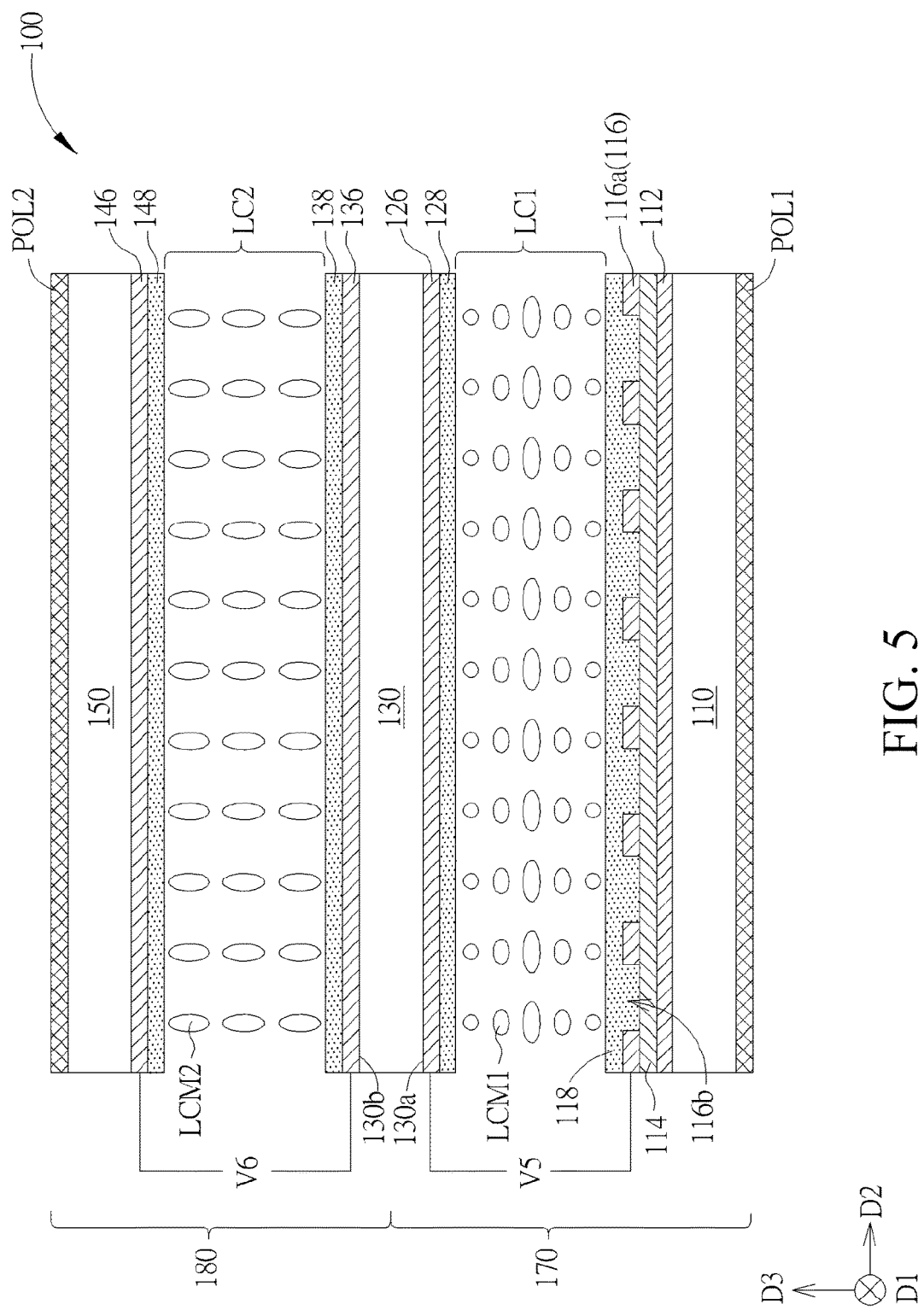
FIG. 5 is a schematic sectional view of the liquid crystal display panel in a second narrow viewing angle mode according to the first embodiment of the present invention.

Referring to FIG. 5, FIG. 5 is a schematic sectional view of a display image of the liquid crystal display panel in a second narrow viewing angle mode according to the first embodiment of the present invention. As shown in FIG. 5, according to the present embodiment, when the liquid crystal display panel 100 is in the second narrow viewing angle mode, there is a fifth potential difference V5 between the first common electrode layer 116 and the first control electrode layer 126, and there is a sixth potential difference V6 between the second common electrode layer 136 and the second control electrode layer 146. The fifth potential difference V5 may be equal to the first potential difference V1, and the sixth potential difference V6 may be greater than the second potential difference V2. In this embodiment, the fifth potential difference V5 is about 0 volts to 5 volts, and the sixth potential difference V6 is about 0 volts to 10 volts, which, however, is not limited thereto. In this mode, because the fifth potential difference V5 is very small, an electric field of the fifth potential difference V5 substantially may not cause the first liquid crystal molecules LCM1 to rotate or topple over along the third direction D3; in another aspect, the sixth potential difference V6 needs to be sufficiently large (and greater than the second potential difference V2), so that an electric field may cause the second liquid crystal molecules LCM2 to rotate or topple over along the third direction D3. That is, a display effect of the first liquid crystal molecules LCM1 may not be affected by the fifth potential difference V5, and an anti-peeping effect of the second liquid crystal molecules LCM2 may be enabled and a display effect is affected due to the sixth potential difference V6. In the second narrow viewing angle mode, because the second liquid crystal molecules LCM2 may rotate or topple over along the third direction D3, polarization directions of light rays passing through the second liquid crystal layer LC2 are changed, so that after the light rays pass through the second polarizer POL2, contrast viewed by a user in a particular direction decreases, and a viewed display image is fuzzy, to implement an anti-peeping function in the particular direction. In this embodiment, in the second narrow viewing angle mode of the liquid crystal display panel 100, anti-peeping is performed for display in a vertical angle. That is, the second structure 180 provides the sixth potential difference V6 in a particular range or having a sufficiently large value, to enable an anti-peeping function, so that contrast of an image viewed by a user in the vertical direction decreases, to perform anti-peeping in the vertical angle. The first structure 170 does not enable an anti-peeping function. Relative to that in the first narrow viewing angle mode, the anti-peeping functions of the first structure 170 and the second structure 180 provide anti-peeping in different angles. In this embodiment, the first structure 170 performs anti-peeping in the horizontal angle, and the second structure 180 performs anti-peeping in the vertical angle.

Figure 6:
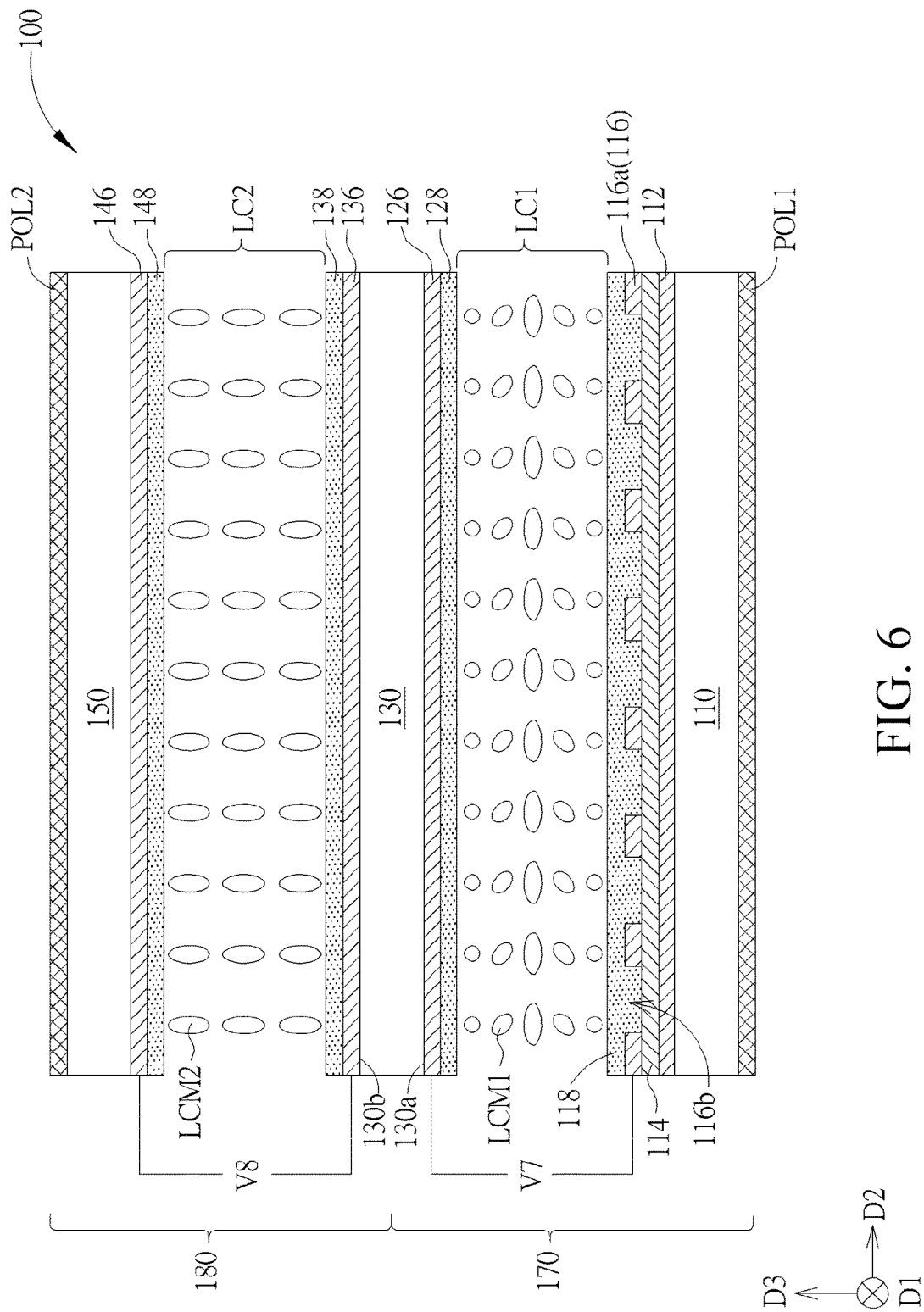
FIG. 6 is a schematic sectional view of the liquid crystal display panel in a third narrow viewing angle mode according to the first embodiment of the present invention.

Referring to FIG. 6, FIG. 6 is a schematic sectional view of a display image of the liquid crystal display panel in a third narrow viewing angle mode according to the first embodiment of the present invention. As shown in FIG. 6, according to the present embodiment, when the liquid crystal display panel 100 is in the third narrow viewing angle mode, there is a seventh potential difference V7 between the first common electrode layer 116 and the first control electrode layer 126, and there is an eighth potential difference V8 between the second common electrode layer 136 and the second control electrode layer 146. The seventh potential difference V7 is greater than the first potential difference V1, and the eighth potential difference V8 is greater than the second potential difference V2. For example, the seventh potential difference V7 is about 0 volts to 10 volts, and the eighth potential difference V8 is about 0 volts to 10 volts, which, however, is not limited thereto. During image display, there is a fringing electric field or a horizontal electric field between the first common electrode layer 116 and the pixel electrode layer 112. Therefore, the seventh potential difference V7 is preferably greater than the eighth potential difference V8, to provide a good effect of the electric field, which, however, is not limited thereto. In this mode, relative to the first potential difference V1, because the seventh potential difference V7 is relatively large, an electric field may cause the first liquid crystal molecules LCM1 to rotate or topple over along the third direction D3; similarly, relative to the second potential difference V2, because the eighth potential difference V8 is relatively large, an electric field may cause the second liquid crystal molecules LCM2 to rotate or topple over along the third direction D3. That is, display effects of the first liquid crystal molecules LCM1 and the second liquid crystal molecules LCM2 may be affected due to the seventh potential difference V7 and the eighth potential difference V8 that are greater than particular values or that are in particular ranges. In addition, the first liquid crystal molecules LCM1 rotate or topple over along the third direction D3 and the second liquid crystal molecules LCM2 rotate or topple over along the third direction D3. Therefore, compared with a case in the wide viewing angle mode. When light rays enter the first liquid crystal layer LC1 or the second liquid crystal layer LC2, polarization directions of the light rays passing through the first structure 170 and the second structure 180 may be changed because the first liquid crystal molecules LCM1 and the second liquid crystal molecules LCM2 rotate or topple over along the third direction D3, so that contrast viewed by a user in the wide viewing angle decreases, and a viewed display image is fuzzy, to implement an anti-peeping function, in the third narrow viewing angle mode in this embodiment, the first structure 170 provides the seventh potential difference V7 to enable an anti-peeping function, so that contrast of an image viewed by a user in a horizontal direction decreases, to implement anti-peeping in a horizontal angle; the second structure 180 provides the eighth potential difference V8 to enable an anti-peeping function, so that contrast of an image viewed by a user in a vertical direction decreases, to implement anti-peeping in a vertical angle. Therefore, in this embodiment, when the liquid crystal display panel 100 is in the third narrow viewing angle mode, the display image of the liquid crystal display panel 100 can be viewed by only a user directly facing the liquid crystal display panel 100, to implement an omnidirectional anti-peeping effect.

Figure 7:
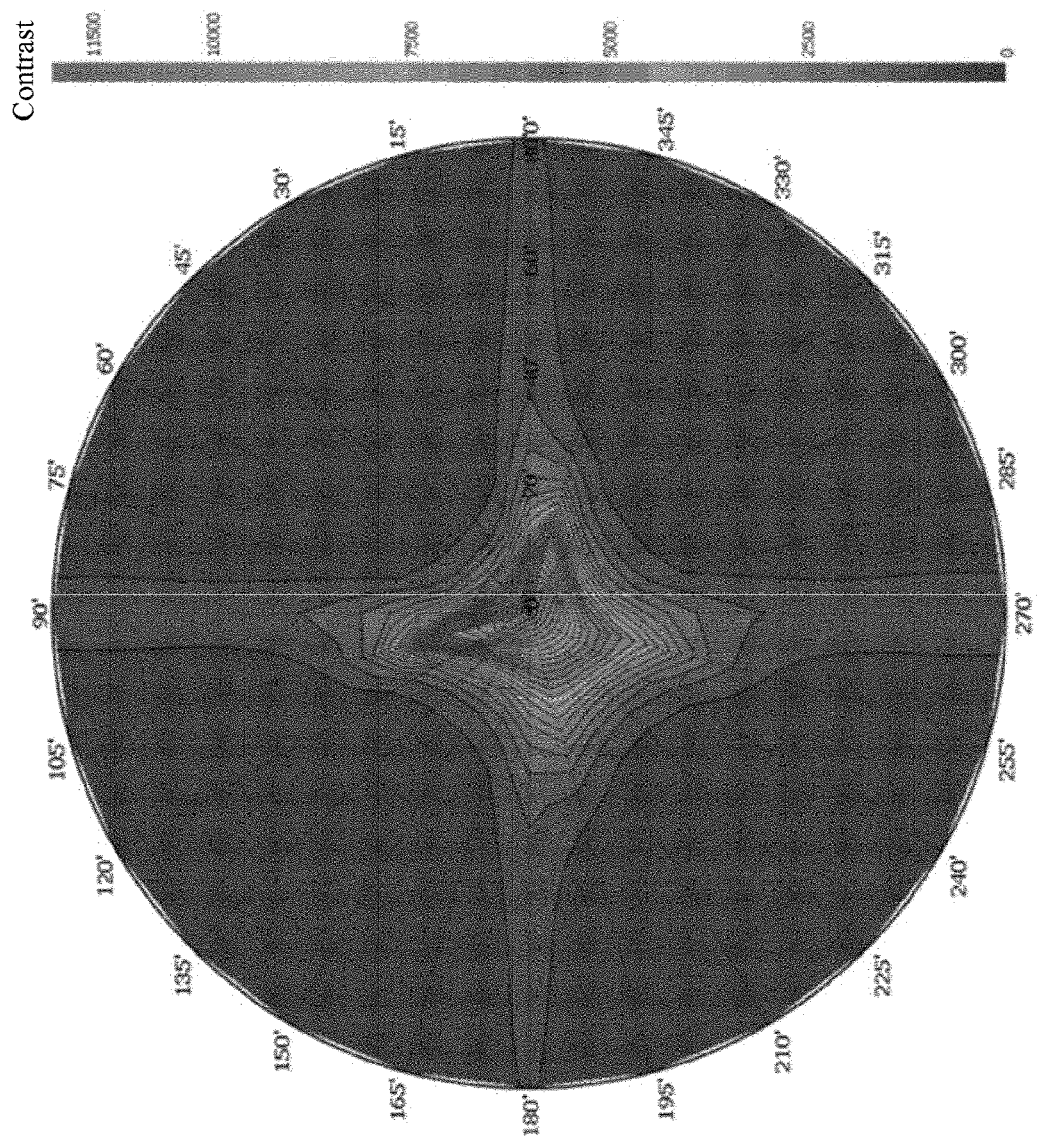
FIG. 7 is a schematic diagram of contrasts of angles of an image display mode when the liquid crystal display panel is in a wide viewing angle mode according to the first embodiment of the present invention.
Figure 8:
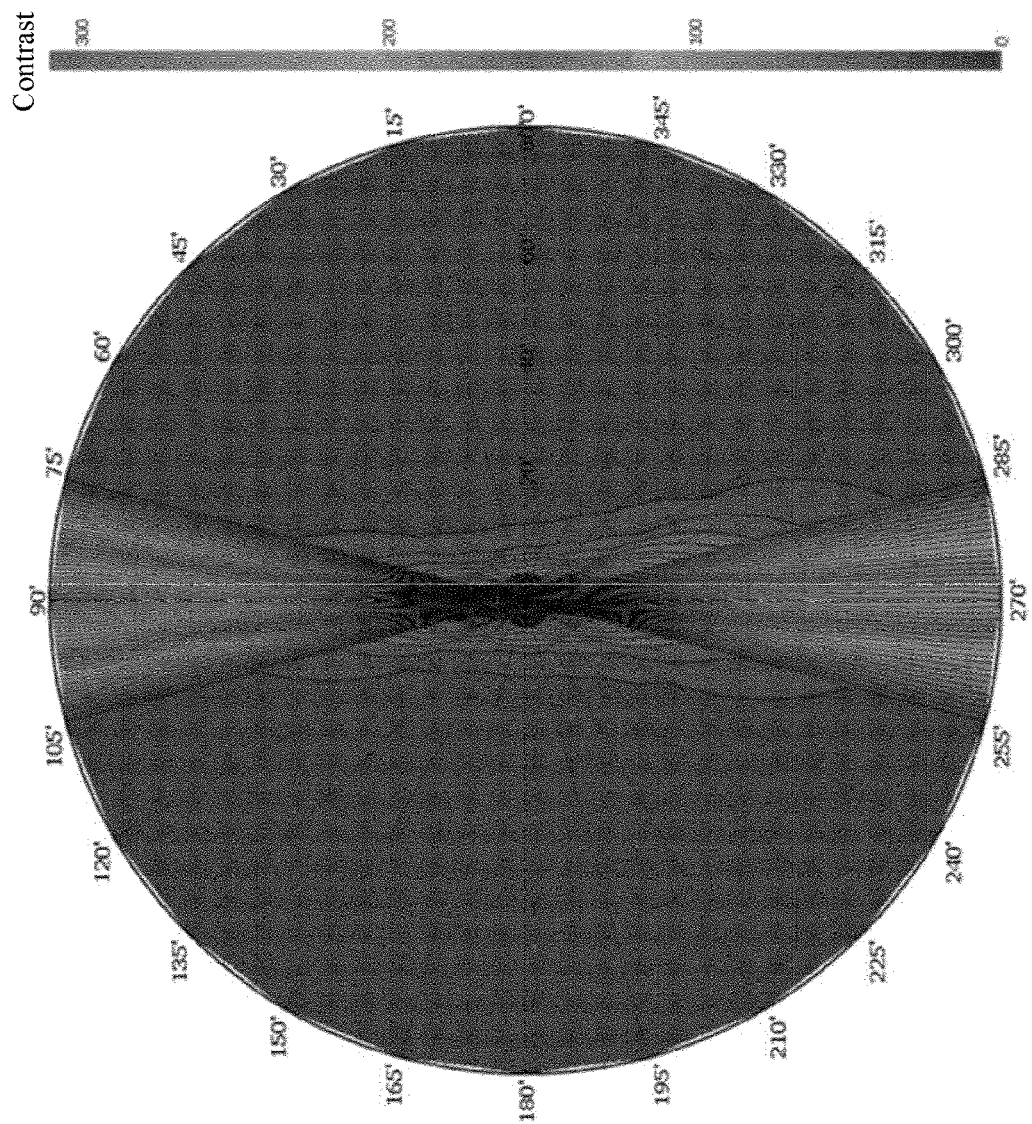
FIG. 8 is a schematic diagram of contrasts of angles of an image display mode when the liquid crystal display panel is in a first narrow viewing angle mode according to the first embodiment of the present invention.
Figure 9:
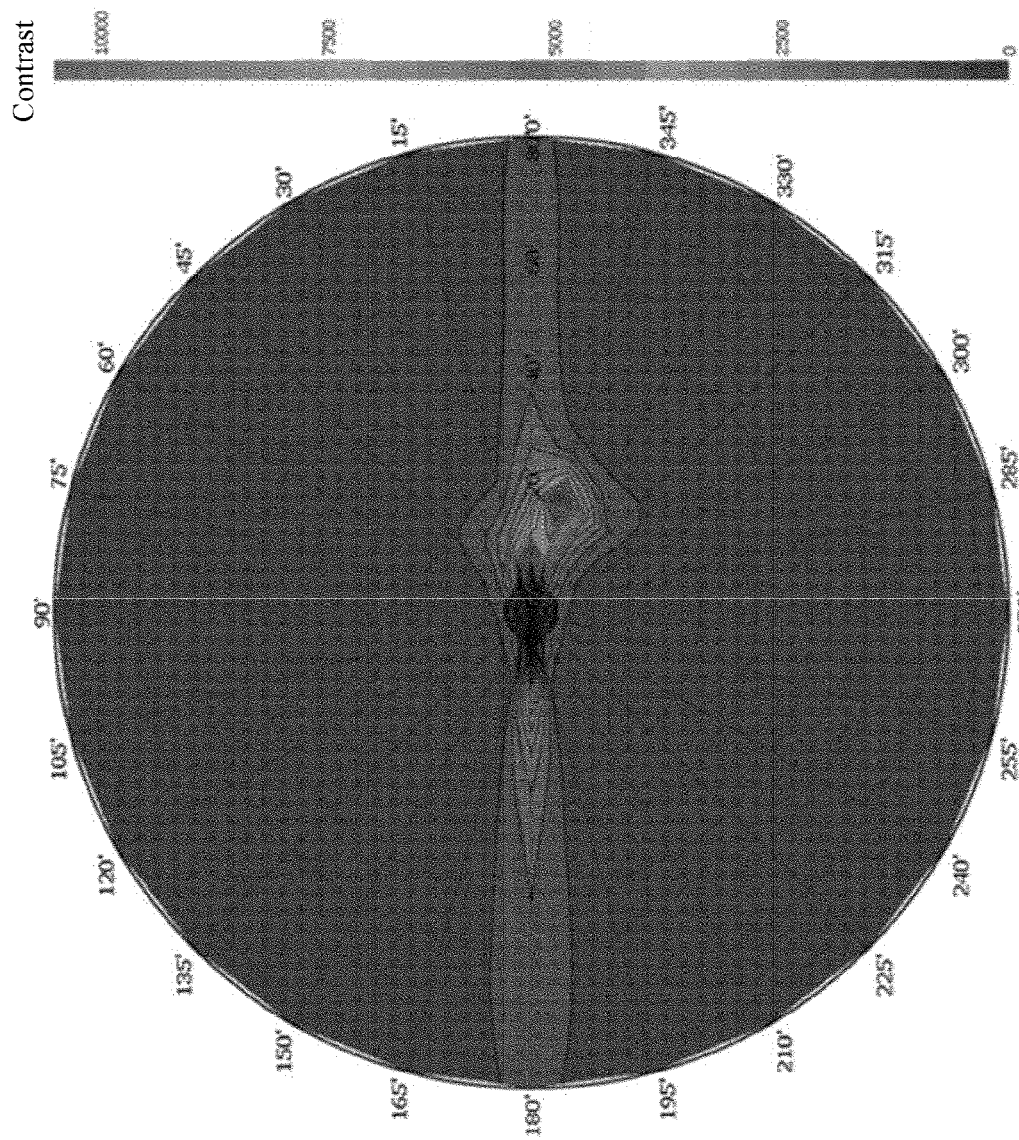
FIG. 9 is a schematic diagram of contrasts of angles of an image display modes when the liquid crystal display panel is in a second narrow viewing angle mode according to the first embodiment of the present invention.
Figure 10:
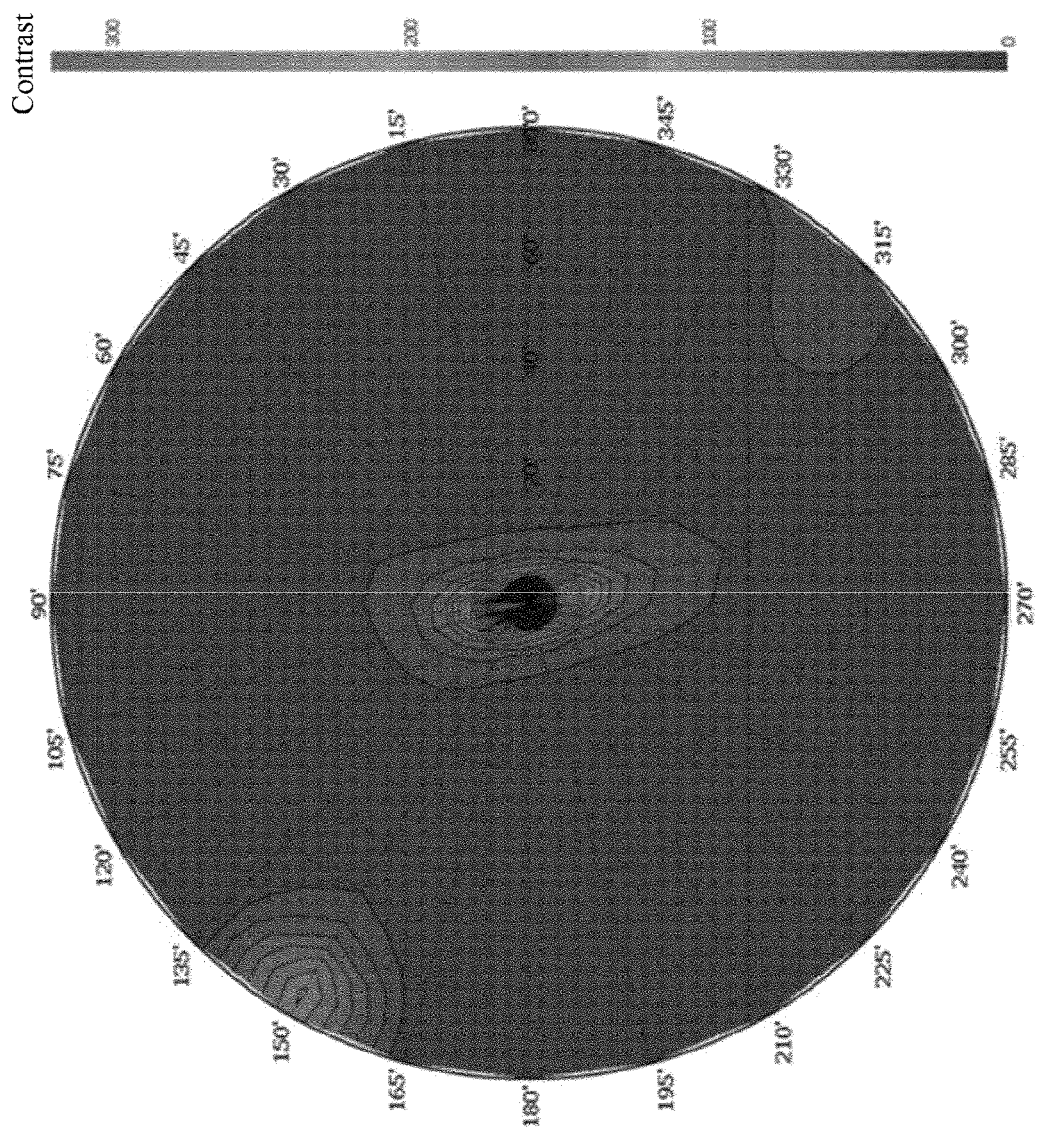
FIG. 10 is a schematic diagram of contrasts of angles of an image display mode when the liquid crystal display panel is in a third narrow viewing angle mode according to the first embodiment of the present invention.

Referring to FIG. 7 to FIG. 10, FIG. 7 is a schematic diagram of contrasts of angles of the image display mode of the liquid crystal display panel in the wide viewing angle mode according to the first embodiment of the present invention, FIG. 8 is a schematic diagram of contrasts of angles of the image display mode of the liquid crystal display panel in the first narrow viewing angle mode according to the first embodiment of the present invention, FIG. 9 is a schematic diagram of contrasts of angles of the image display mode of the liquid crystal display panel in the second narrow viewing angle mode according to the first embodiment of the present invention, and FIG. 10 is a schematic diagram of contrasts of angles of the image display mode of the liquid crystal display panel in the third narrow viewing angle mode according to the first embodiment of the present invention. In images displayed in the display modes in FIG. 7 to FIG. 10, polar angles of the liquid crystal molecules are 50 degrees. As shown in FIG. 7, when the liquid crystal display panel 100 in this embodiment is in the wide viewing angle mode, contrast of a display image viewed by a user in a horizontal direction and contrast of a display image viewed by the user in a vertical direction both may reach at least 800, and on average, the user can view clear images at every direction and the images are wide viewing angle images. As shown in FIG. 8, when the liquid crystal display panel 100 in this embodiment is in the first narrow viewing angle mode, contrast (the contrast is less than 100) of a display image viewed in a horizontal angle decreases. Therefore, if the user is in the horizontal direction and views the liquid crystal display panel 100 at a relatively wider viewing angle (for example, the angle is greater than 5 degrees), the user cannot clearly view the image, so that an anti-peeping effect in the horizontal angle is achieved. As shown in FIG. 9, when the liquid crystal display panel 100 in this embodiment is in the second narrow viewing angle mode, contrast (the contrast is less than 100) of a display image viewed by a user in a vertical angle decreases. Therefore, if the user is in the vertical direction and views the liquid crystal display panel 100 at a relatively wider viewing angle (for example, the angle is greater than 5 degrees), the user cannot clearly view the image, so that an anti-peeping effect in the vertical angle is achieved. As shown in FIG. 10, when the liquid crystal display panel 100 in this embodiment is in the third narrow viewing angle mode, contrast (the contrast is less than 100) of a display image viewed by a user in a horizontal angle and a vertical angle decreases. Therefore, if the user is in the horizontal direction or the vertical direction and views the liquid crystal display panel 100 at a relatively wider viewing angle (for example, the angle is greater than 5 degrees), the user cannot clearly view the image, so that anti-peeping effects in the horizontal angle and the vertical angle are achieved, that is, an omnidirectional anti-peeping effect is achieved.

The liquid crystal display panel in this embodiment is not limited to the foregoing embodiments. The following sequentially describes a liquid crystal display panel in other preferred embodiments. In addition, for the convenience of comparison between the embodiments and for simple description of the differences, in the following embodiments, the same symbols are used to mark the same components, the differences between the embodiments are described mainly, and the repeated parts are not described again.

Figure 11:
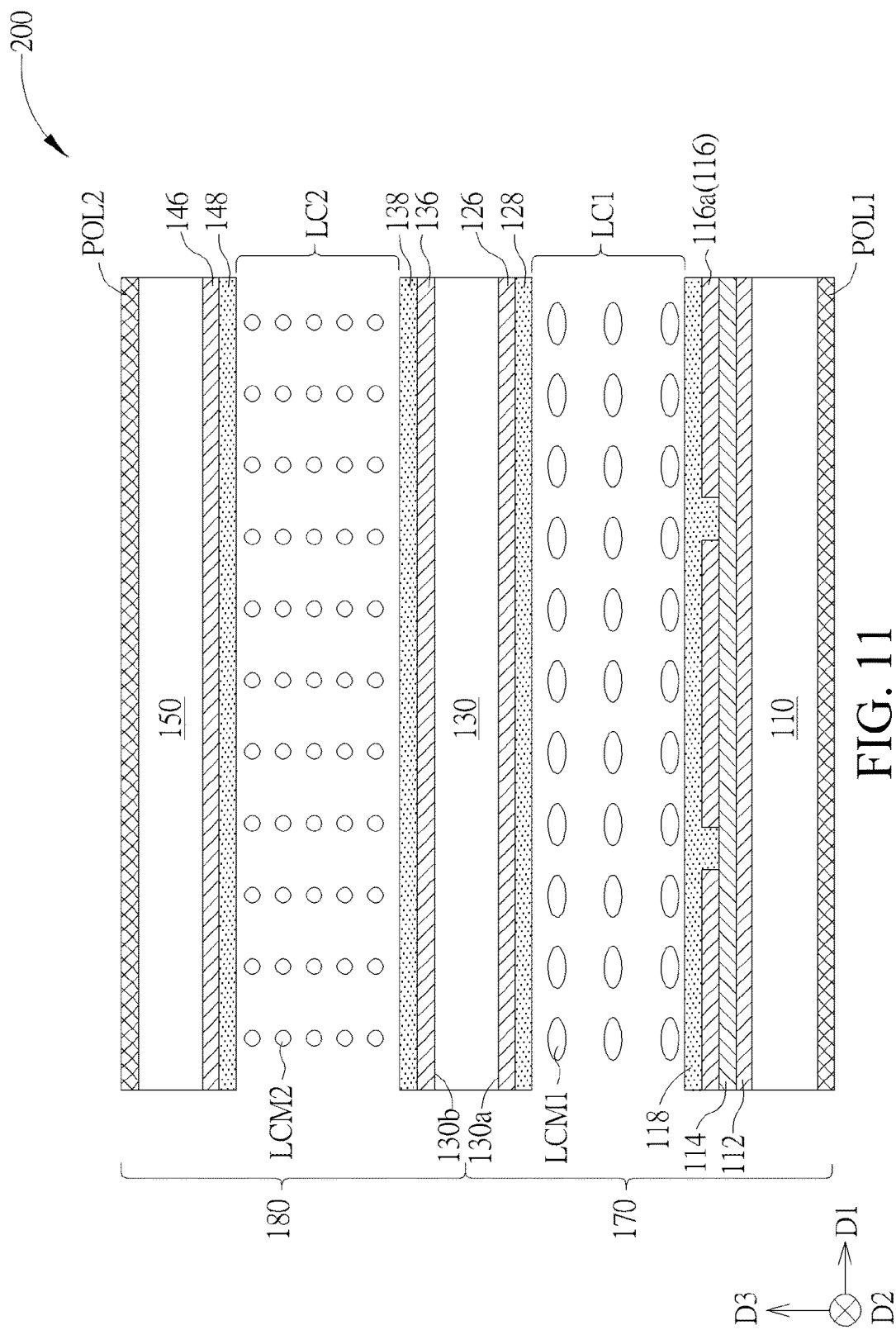
FIG. 11 is a schematic sectional view of a liquid crystal display panel according to a second embodiment of the present invention.
Figure 12:
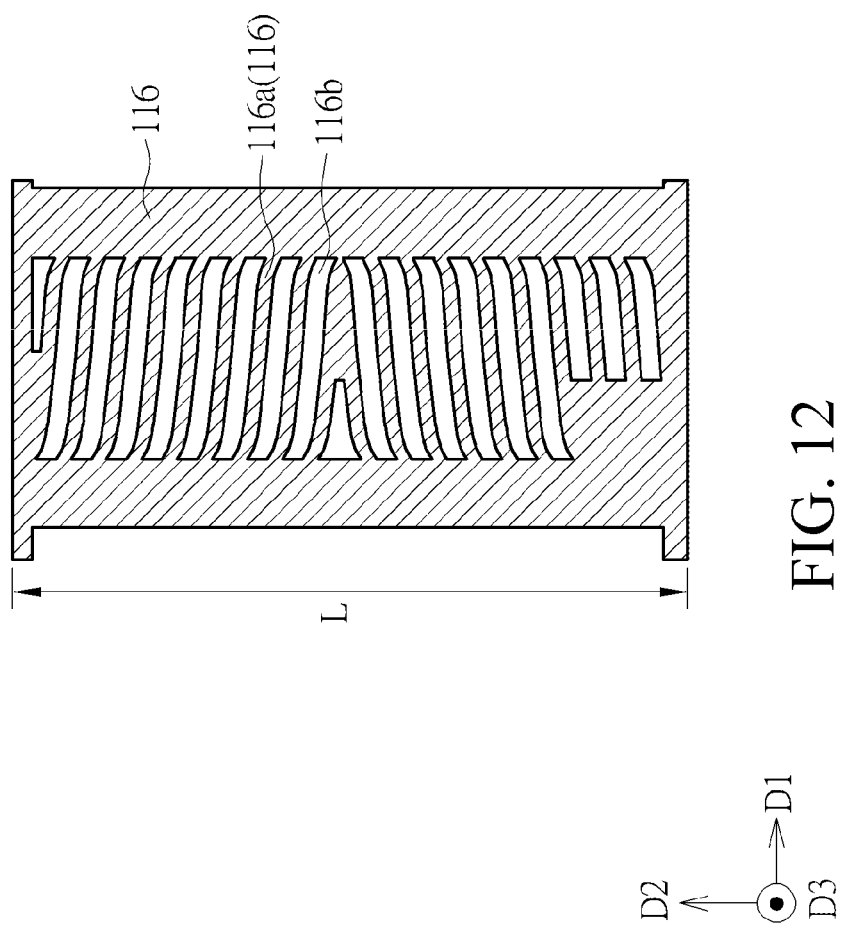
FIG. 12 is a schematic top view of a part of a first common electrode layer of the liquid crystal display panel according to the second embodiment of the present invention.

Referring to FIG. 11 and FIG. 12, FIG. 11 is a schematic sectional view of a liquid crystal display panel according to a second embodiment of the present invention, and FIG. 12 is a schematic top view of a part of a first common electrode layer 116 of the liquid crystal display panel according to the second embodiment of the present invention. FIG. 12 shows only a part, in single sub-pixels, of the first common electrode layer 116. As shown in FIG. 11 and FIG. 12, a difference between this embodiment and the first embodiment lies in that in the liquid crystal display panel 200 in this embodiment, a polarization axis of a first polarizer POL1 is parallel to a second direction D2 and a polarization axis of a second polarizer POL2 is perpendicular to the second direction D2. That is, the polarization axis of the first polarizer POL1 is perpendicular to an alignment direction of first liquid crystal molecules LCM1, and the second polarizer POL2 is perpendicular to an alignment direction of second liquid crystal molecules LCM2. In another aspect, in this embodiment, a length direction L of sub-pixels is perpendicular to the first direction D1, and there is an included angle less than or equal to 45 degrees between an extension direction of branch electrodes 116a and the first direction D1. That is, a setting manner of the branch electrodes 116a in this embodiment is substantially different from a setting manner of the branch electrodes 116a in the first embodiment. In this embodiment, when the first liquid crystal molecules LCM1 rotate or topple over along the third direction D3 due to a potential difference, a first structure 170 provides the potential difference to enable an anti-peeping function, so that contrast of an image viewed by a user in a vertical direction decreases, to perform anti-peeping in the vertical angle. Similarly, when the second liquid crystal molecules LCM2 rotate or topple over along the third direction D3 due to a potential difference, a second structure 180 provides the potential difference to enable an anti-peeping function, so that contrast of an image viewed by a user in a horizontal direction decrease, to perform anti-peeping in the horizontal angle. Therefore, in this embodiment, when the liquid crystal display panel is in a first narrow viewing angle mode, anti-peeping in a vertical angle may be performed; when the liquid crystal display panel is in a second narrow viewing angle mode, anti-peeping in a horizontal angle may be performed; and when the liquid crystal display panel is in a third narrow viewing angle mode, omnidirectional anti-peeping may be performed.

Figure 13:
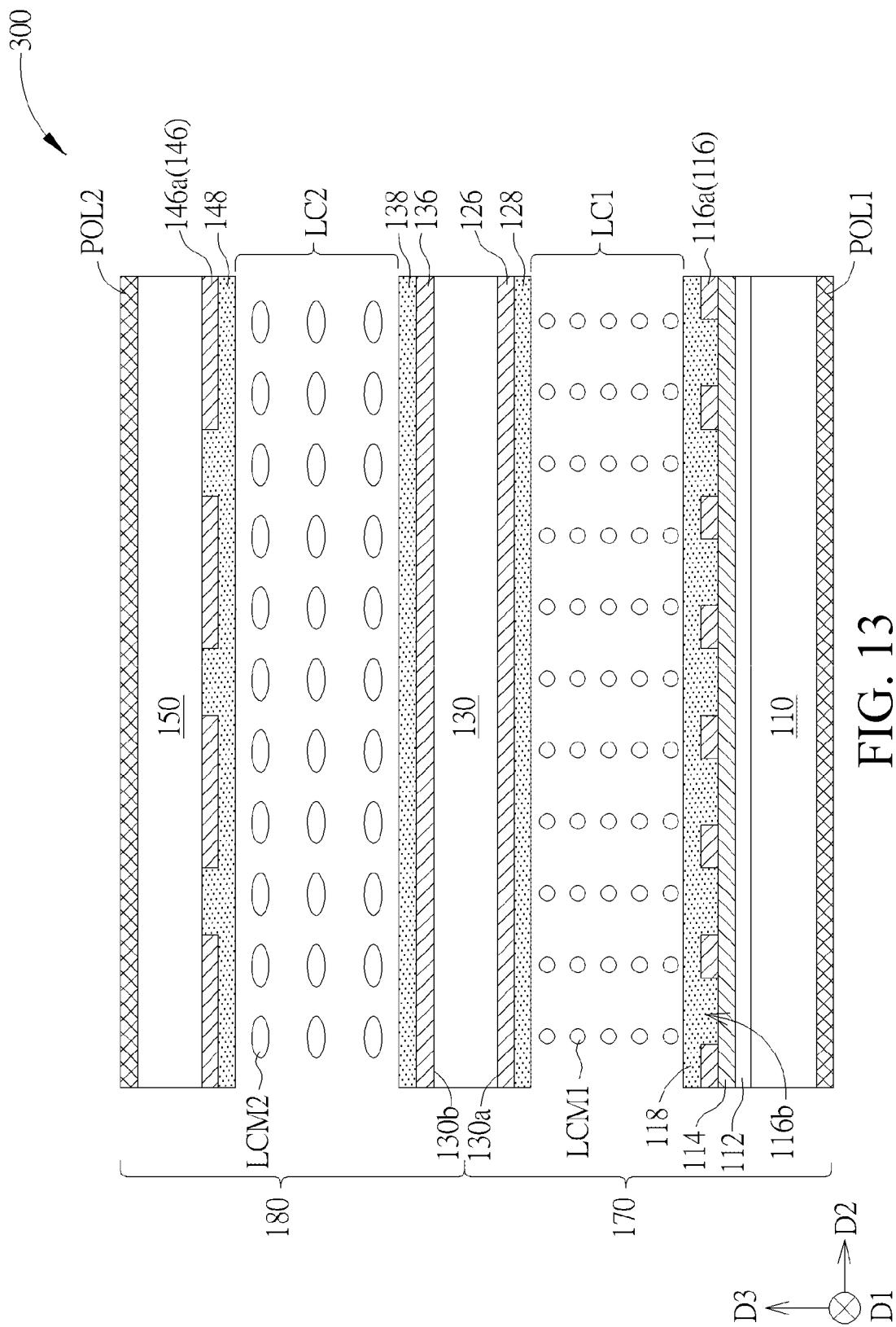
FIG. 13 is a schematic sectional view of a liquid crystal display panel according to a third embodiment of the present invention.

Referring to FIG. 13, FIG. 13 is a schematic sectional view of a liquid crystal display panel according to a third embodiment of the present invention. As shown in FIG. 13, a difference between this embodiment and the first embodiment lies in that in this embodiment, a second control electrode layer 146 of a liquid crystal display panel 300 includes multiple second control electrodes 146a, and different potentials may be provided to the second control electrodes 146a. Therefore, there may be different potential differences between each of the second control electrodes 146a and the second common electrode layer 136. That is, in this embodiment, the second control electrodes 146a and the second common electrode layer 136 have different potentials. In other words, when the liquid crystal display panel 300 in this embodiment displays an image, an anti-peeping function of the second structure 180 may be enabled according to regions, and anti-peeping is performed for a part of image.

In addition, in this embodiment, the liquid crystal display panel 300 may further include a conducting layer (not shown in the figure) and an insulation protection layer (not shown in the figure). The conducting layer is disposed between the second control electrode layer 146 and a third substrate 150, and the insulation protection layer is disposed between the second control electrode layer 146 and the conducting layer. However, a setting manner is not limited thereto. The conducting layer includes touch control signal lines, respectively electrically connected to the second control electrodes 146a, to respectively control the second control electrodes 146a. The touch control signal lines are used to respectively transmit touch control signals and anti-peeping signals (potentials) to the second control electrodes 146a, or the second control electrodes 146a transmit touch control signals to a touch control processing unit. That is, when the second control electrodes 146a receive the touch control signals, the second control electrodes may be used as touch control sensing electrodes, and transmit the touch control signals through different touch control signal lines, to implement a function of a touch control electrode. When the second control electrodes 146a receive the anti-peeping signals (potentials), the second control electrodes may respectively control anti-peeping functions on different regions, to implement a regional anti-peeping function. Therefore, the liquid crystal display panel 300 in this embodiment may form, by means of structures of the second control electrodes 146a, an in-cell liquid crystal display panel having an anti-peeping function. It should be noted that, the touch control signal lines may respectively transmit the touch control signals and provide voltages to the second control electrodes 146a by using different time sequences, so that the second control electrodes 146a may implement, in different time sequences, a touch control sensing function and a function of controlling regional anti-peeping.

In conclusion, in the liquid crystal display panel in the present invention, two liquid crystal structures and electrode layers are set, so that two liquid crystal structures implement anti-peeping in different angles, to form four different image display modes, and a user optionally uses the liquid crystal display panel in the present invention to implement anti-pepping in a single angle or omnidirectional anti-peeping.

The foregoing are merely exemplary embodiments of the present invention, and any change or modification made according to the patent scope of the present invention shall fall within the scope of the present invention.

What is claimed is:
1. A liquid crystal display panel, comprising:
a first substrate;
a second substrate disposed opposite to the first substrate, wherein the second substrate has a first surface and a second surface, and the first surface faces the first substrate;
a third substrate disposed opposite to the second substrate, wherein the second substrate is located between the first substrate and the third substrate;
a pixel electrode layer disposed on the first substrate;
a first common electrode layer disposed on the first substrate;
a first control electrode layer disposed on the second substrate;
a first liquid crystal layer disposed between the first substrate and the second substrate, wherein the first liquid crystal layer comprises a plurality of first liquid crystal molecules, and the first liquid crystal molecules being adjacent to the first substrate and the first liquid crystal molecules being adjacent to the second substrate are aligned along a first direction;
a second common electrode layer disposed on the second substrate;
a second control electrode layer disposed on the third substrate; and
a second liquid crystal layer disposed between the second substrate and the third substrate, wherein the second liquid crystal layer comprises a plurality of second liquid crystal molecules, the second liquid crystal molecules being adjacent to the second substrate and the second liquid crystal molecules being adjacent to the third substrate are aligned along a second direction, and the second direction is not parallel to the first direction.

2. The liquid crystal display panel according to claim 1, wherein the first direction is perpendicular to the second direction.

3. The liquid crystal display panel according to claim 1, further comprising:
a first polarizer, wherein the first substrate is located between the second substrate and the first polarizer, and a polarization axis of the first polarizer is parallel to or perpendicular to the first direction; and a second polarizer, wherein the third substrate is located between the second substrate and the second polarizer, and a polarization axis of the second polarizer is perpendicular to the polarization axis of the first polarizer.

4. The liquid crystal display panel according to claim 1, wherein the first liquid crystal molecules and the second liquid crystal molecules are with positive dielectric anisotropy.

5. The liquid crystal display panel according to claim 1, wherein when the liquid crystal display panel is in a wide viewing angle mode, a first potential difference between the first common electrode layer and the first control electrode layer is about 0 volts to 5 volts, and a second potential difference between the second common electrode layer and the second control electrode layer is about 0 volts.

6. The liquid crystal display panel according to claim 5, wherein when the liquid crystal display panel is in a first narrow viewing angle mode, a third potential difference between the first common electrode layer and the first control electrode layer is about 0 volts to 10 volts, and a fourth potential difference between the second common electrode layer and the second control electrode layer is about 0 volts.

7. The liquid crystal display panel according to claim 6, wherein the third potential difference is greater than the first potential difference.

8. The liquid crystal display panel according to claim 5, wherein when the liquid crystal display panel is in a second narrow viewing angle mode, a fifth potential difference between the first common electrode layer and the first control electrode layer is about 0 volts to 5 volts, and a sixth potential difference between the second common electrode layer and the second control electrode layer is about 0 volts to 10 volts.

9. The liquid crystal display panel according to claim 5, wherein when the liquid crystal display panel is in a third narrow viewing angle mode, a seventh potential difference between the first common electrode layer and the first control electrode layer is about 0 volts to 10 volts, and an eighth potential difference between the second common electrode layer and the second control electrode layer is about 0 volts to 10 volts.

10. The liquid crystal display panel according to claim 9, wherein the seventh potential difference is greater than the first potential difference.

11. The liquid crystal display panel according to claim 1, wherein the second control electrode layer comprises a plurality of second control electrodes.

12. The liquid crystal display panel according to claim 11, wherein the second control electrodes are respectively electrically connected to a plurality of touch control signal lines, and the touch control signal lines are configured to respectively transmit touch control signals to the second control electrodes and to respectively provide voltages to the second control electrodes.

13. The liquid crystal display panel according to claim 12, wherein the second control electrodes and the second common electrode layer have different potentials.

14. The liquid crystal display panel according to claim 1, further comprising:
a first alignment layer disposed on a surface of the first substrate facing the second substrate; and
a second alignment layer disposed on the first surface of the second substrate.

15. The liquid crystal display panel according to claim 1, further comprising:
a third alignment layer disposed on the second surface of the second substrate; and
a fourth alignment layer disposed on a surface of the third substrate facing the second substrate.

16. The liquid crystal display panel according to claim 1, further comprising an insulation layer disposed between the pixel electrode layer and the first common electrode layer.

* * * * *